US009053607B2

(12) United States Patent
Jacob et al.

(10) Patent No.: US 9,053,607 B2
(45) Date of Patent: Jun. 9, 2015

(54) EMULATOR FOR PRODUCTION SOFTWARE OUTCOME VALIDATION

(71) Applicant: WMS GAMING, INC., Waukegan, IL (US)

(72) Inventors: Joshuah Jacob, Chicago, IL (US); Paul Trotter, Buffalo Grove, IL (US); Arthur Scott Lanford, Chicago, IL (US); Saji Lazar, Des Plaines, IL (US)

(73) Assignee: WMS GAMING, INC., Waukegan, IL (US)

( * ) Notice: Subject to any disclaimer, the term of this patent is extended or adjusted under 35 U.S.C. 154(b) by 217 days.

(21) Appl. No.: 13/753,843

(22) Filed: Jan. 30, 2013

(65) Prior Publication Data

US 2014/0213368 A1 Jul. 31, 2014

(51) Int. Cl.
*G06F 9/44* (2006.01)
*G07F 17/32* (2006.01)

(52) U.S. Cl.
CPC .................................. *G07F 17/3241* (2013.01)

(58) Field of Classification Search
CPC G06F 11/3664; G06F 9/45504; G06F 11/261
USPC .................................. 717/124, 129, 134, 135
See application file for complete search history.

(56) References Cited

U.S. PATENT DOCUMENTS

| | | | | |
|---|---|---|---|---|
| 8,308,567 | B2 | 11/2012 | Blackburn et al. | |
| 8,323,103 | B2 | 12/2012 | Fabbri | |
| 2002/0021272 | A1 * | 2/2002 | Zeh | 345/87 |
| 2004/0107415 | A1 * | 6/2004 | Melamed et al. | 717/124 |
| 2007/0234017 | A1 * | 10/2007 | Moyer | 712/227 |
| 2008/0176713 | A1 * | 7/2008 | Olivera Brizzio et al. | 482/8 |
| 2013/0137498 | A1 * | 5/2013 | Willyard | 463/16 |

* cited by examiner

*Primary Examiner* — Anna Deng
(74) *Attorney, Agent, or Firm* — Miller, Matthias & Hull LLP

(57) ABSTRACT

A test tool provides a flexible resource for control an of electronic gaming machine (EGM) via a data network. The test tool provides both interactive and automated access to the EGM when the EGM is operated using a special diagnostic BIOS that supports both communication with the test tool over the data network and the ability to set operational variables including random numbers. The test tool can use structured data test scripts, such as XML files, to automate repetitive testing of one or more gaming machines by automating breakpoint setting, variable settings, and comparison of expected results based on game type, paytables, currency, etc.

18 Claims, 8 Drawing Sheets

EMULATOR FOR PRODUCTION SOFTWARE OUTCOME VALIDATION

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE DISCLOSURE

The present disclosure relates generally to gaming systems and methods, and more particularly to validation of production software using an automated emulation process.

BACKGROUND OF THE DISCLOSURE

Gaming machines, such as slot machines, video poker machines, and the like, have been a cornerstone of the gaming industry for many years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

However, the market demand for new games and features does not remove the regulatory requirements associated with validation of production software by independent agencies or testing services. Even though these validation organizations can use a diagnostics BIOS to access certain features of an EGM, the manual interfaces available for testing and the need to hand enter data such as random numbers is time consuming, may introduce errors into the testing process, is not reliably repeatable, and can place the EGM in modes that can only be recovered from via a reboot requiring up to 15 minutes per occurrence.

Because EGMs may operate in a gaming mode only with certain physical safeguards in place, a traditional in-circuit emulator may not always be an option for validation testing.

SUMMARY OF THE DISCLOSURE

According to one aspect of the present disclosure a testing tool for validation of production software in an electronic gaming machine may include a validation service executed by a first processor installed in the electronic gaming machine, where the validation service has access to system resources of the electronic gaming machine via a diagnostic basic input/output system (BIOS). The testing tool may also include an emulation tool executed by a second processor installed in a host system, with the emulation tool in communication with the validation service of the electronic gaming machine via a network. The emulation tool may include a user interface module configured to present: i) a selection of operating options, ii) an electronic gaming machine state, and iii) validation results. The emulation tool may also include an structured data file parser configured to set test parameters based on information stored in a file containing structured data and a results module configured to generate validation results by comparing actual results and expected results.

Figure 1:
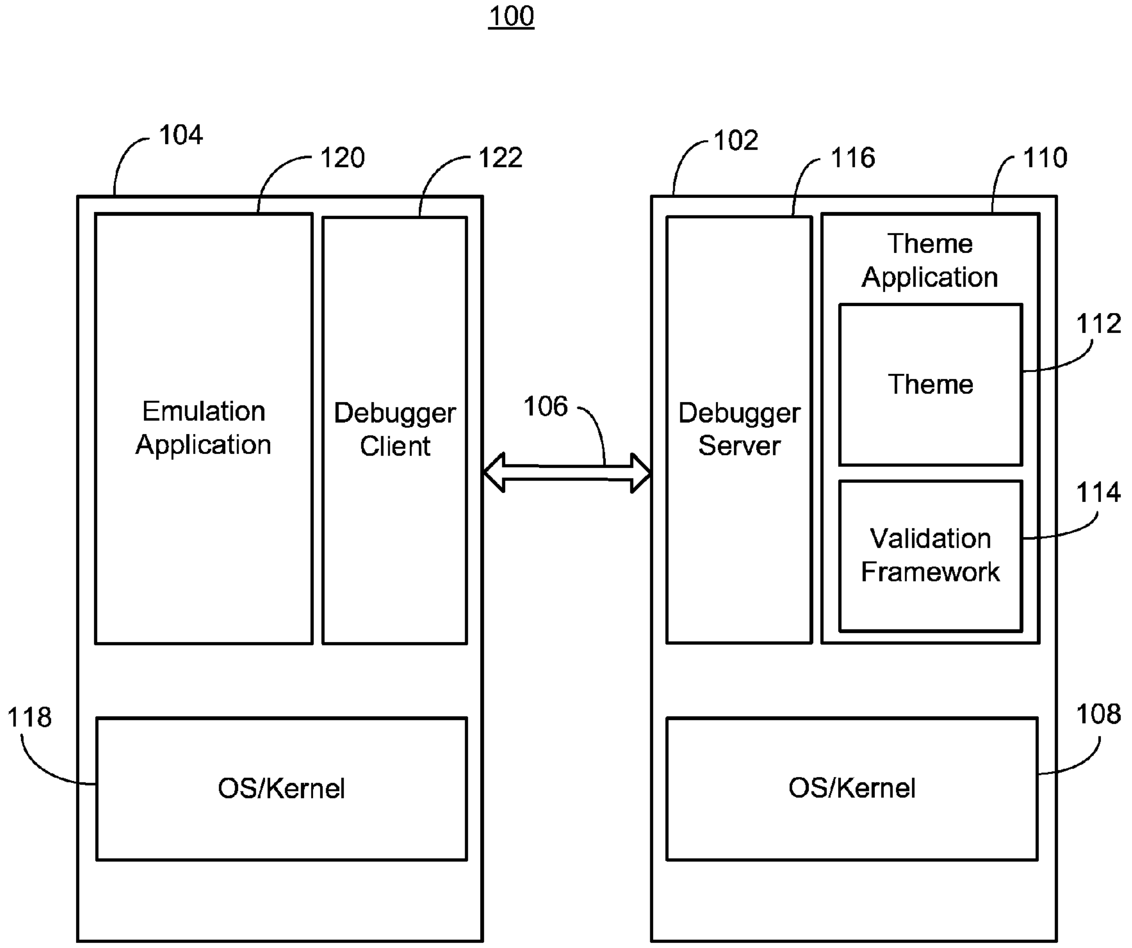
FIG. 1 is a block diagram that illustrates an exemplary system supporting production software validation in an electronic gaming machine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the appended claims.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. While the present disclosure may be embodied in many different forms, the embodiments set forth in the present disclosure are to be considered as exemplifications of the principles of the present disclosure and are not intended to be limited to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

As discussed above, validation testing of production software in an electronic gaming machine can be labor-intensive and time-consuming. The combination of possible combinations and permutations of symbols in a progressive-style gaming machine can run well into the thousands. Further, a particular model of electronic gaming machine may be installed in locations having different regulations and/or operator goals so that there may often be 70-150 paytables per model. Therefore exhaustive testing of every combination of symbols and payouts may not be possible even apart from the desire of manufacturers and operators to put new machines into operation as quickly as possible.

An emulation tool running on a host computer permits multiple operating modes including a prior art manual mode, a semi-automated mode, and a fully automated mode. Additional safeguards help avoid time consuming time-out restarts and the associated lost test-in-progress results. One or more test scripts, can specify not only test initial conditions, but also test-in-progress symbol (reel) settings, random number settings, and expected results. The test script or scripts may be formatted using structured data such as, but not limited to eXtensible Markup Language (XML). As with any structured data, for example, hypertext markup language (HTML), the data is tagged to allow simple identification and is generally human readable, compared to compiled data. For simplicity, the following discussion makes reference to XML data and files formatted using XML data, but the use of XML is not required for the successful application of the techniques described herein.

Electronic gaming machine verification agencies can use the human readable aspects of the test scripts to verify manufacturer-supplied scripts as well as create their own. In a fully automated mode, the electronic gaming machine may be run through a full slate of trials to test the outcomes of different game situations including bonus games and internal meter status using, among other things, random number and reel states.

FIG. 1 is a block diagram that illustrates an exemplary system 100 supporting production software validation in an electronic gaming machine 102. The electronic gaming machine 102 may be connected to a validation computer 104 via a network 106, such as, but not limited to, an IP network. The electronic gaming machine 102 is illustrated at a high level showing operating system 108 and a theme application 110 that may include the theme, or game, program 112 as well as a validation framework 114. The validation framework 114 may expose breakpoints during game execution when operating with a special diagnostic binary input output system (BIOS). The validation framework may further support setting internal variables and reporting internal status at breakpoints. The electronic gaming machine 102 may also include a debugger server 116 that is active during operation under the diagnostic BIOS. The debugger server 116 may manage communications with a debugger client 122 operating on the validation computer 104. Because the electronic gaming machine 102 is passive with respect to the validation operations, the construct of a server is useful in that the debugger server 116 may wait for inbound traffic from the debugger client 122. However, other constructs may be used instead of the client/server model, such as peer-to-peer connections or RPC calls. Additional details with respect to the electronic gaming machine 102 are discussed below with respect to FIG. 2.

The validation computer 104 may include an operating system 118, an emulation application 120, and the debugger client 122. In an embodiment, the operating system 118 may be a Linux operating system, although other known operating systems are capable of supporting the functions associated with the emulation application 120 and the debugger client 122. The emulation application 120 manages user interaction, automated validation processing, and communication management with the electronic gaming machine 102 via the debugger client 122. The validation computer 104 and, more particularly, the emulation application 120 are discussed in more detail below with respect to FIG. 3.

Figure 2:
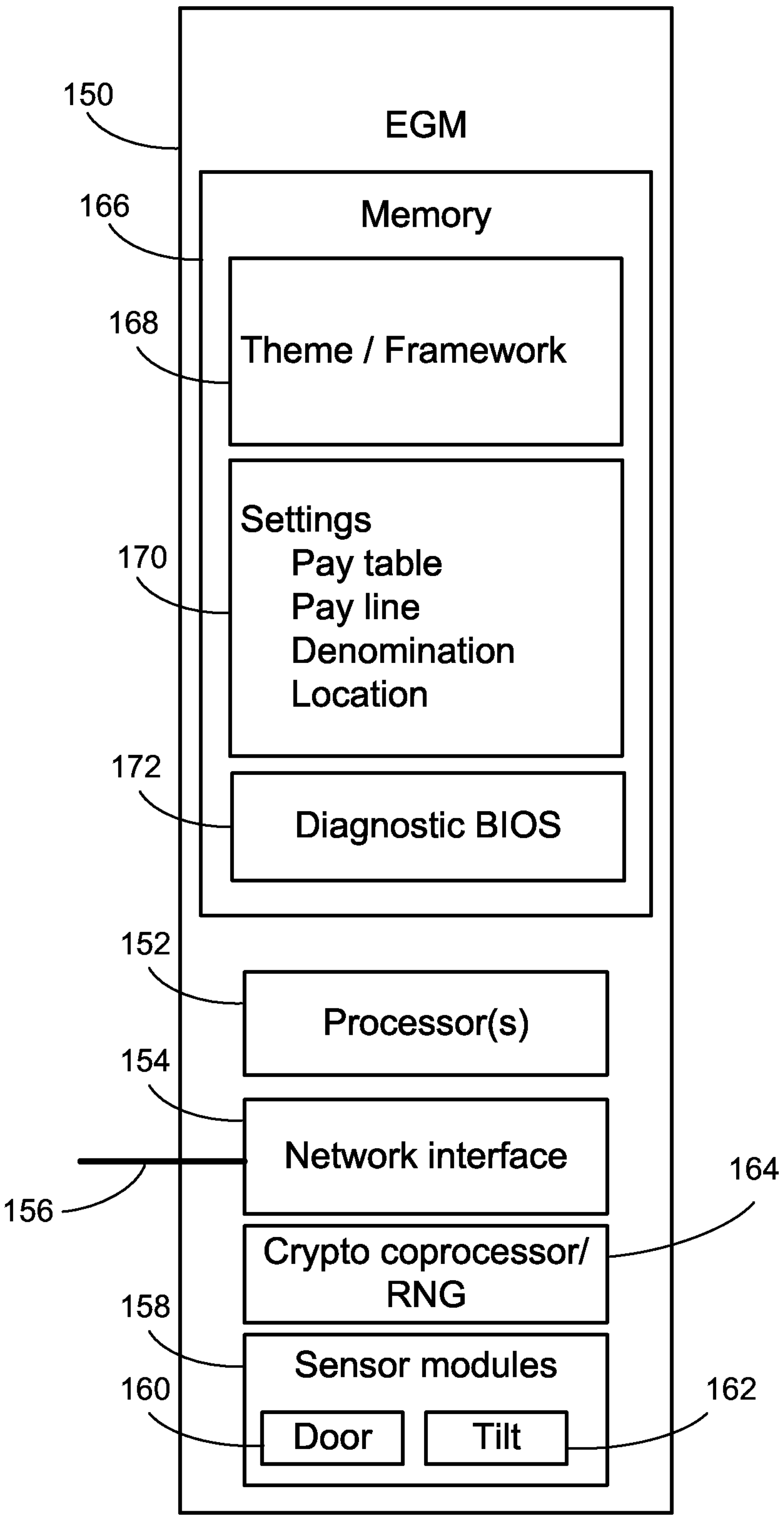
FIG. 2 is a block diagram that illustrates particular elements of an electronic gaming machine relevant to production software validation.

FIG. 2 is a block diagram that illustrates particular elements of an electronic gaming machine 150 relevant to production software validation. The electronic gaming machine (EGM) 150 may be the same as or similar to the electronic gaming machine 102 of FIG. 1. The electronic gaming machine 150 may include a processor 152, a network interface 154 communicating via a data network 156, and sensor modules 158 including, but not limited to, a door sensor 160 and a tilt sensor 162. The electronic gaming machine 150 may also include a cryptographic coprocessor 164 that typically includes a random number generator (RNG).

The EGM 150 may also include a memory 166 that may include one or more physical memory devices capable of volatile and non-volatile data storage, at least some of which may be removable. In one embodiment, the memory 166 may include a game theme and framework 168, settings information 170 may include paytable information, pay line information, currency denomination, physical geographic location, etc. In other embodiments some or all of this information may be included in the theme and framework 168. The memory 166 may also include a diagnostic BIOS 172 that is used during software validation testing. The diagnostic BIOS 172 is often stored in a removable memory and is required for activation of features in the framework portion of the theme 168 as well as providing communication support to the validation computer 104 during validation testing.

Figure 3:
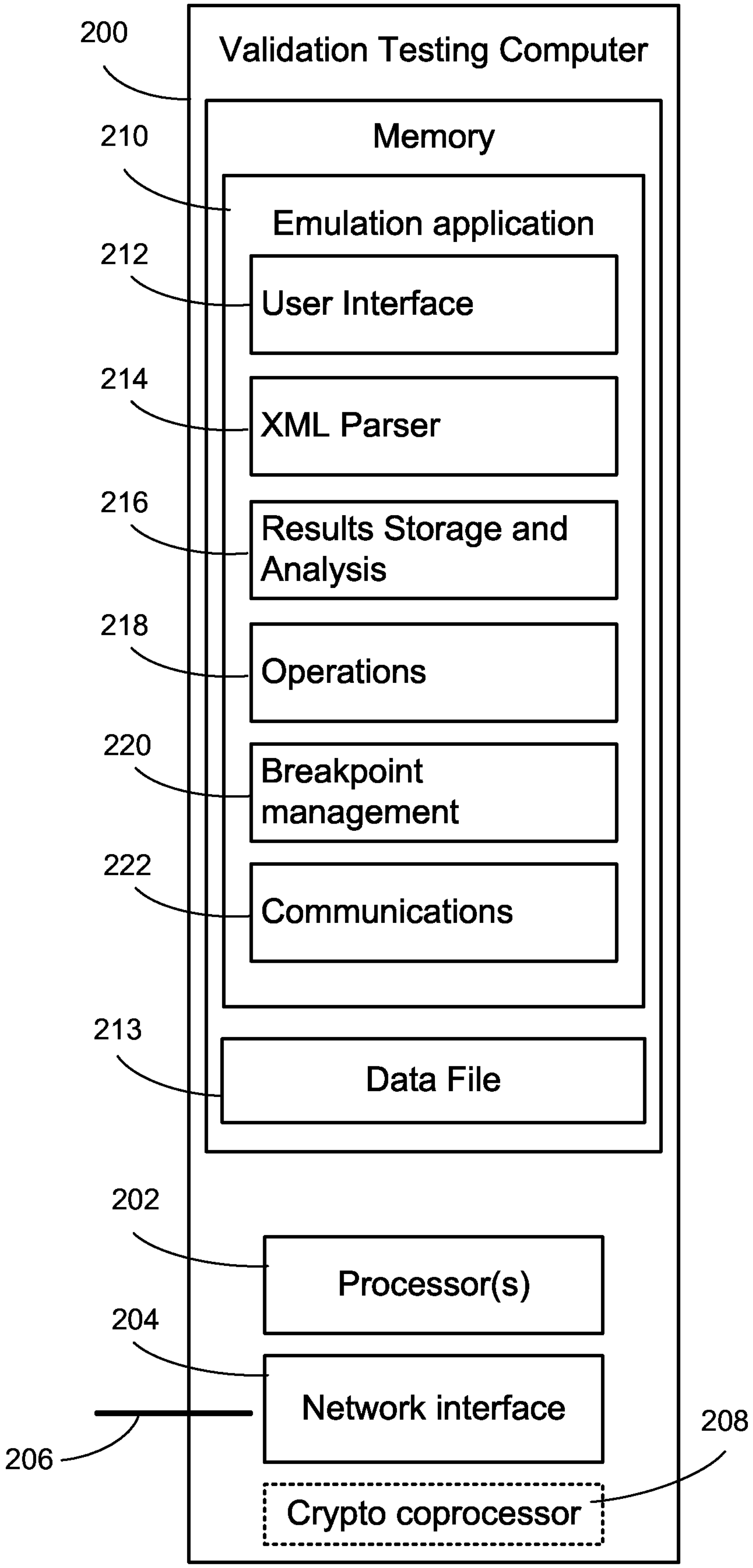
FIG. 3 is a block diagram that illustrates particular elements of a validation computer used for production software validation.

FIG. 3 is a block diagram that illustrates particular elements of a validation computer 200 used for production software validation. The validation computer 200 may be the same as or similar to the validation computer 104 of FIG. 1. The validation computer 200 may include a processor 202, a network interface 204 supporting communication via a data network 206 and may also include a cryptographic coprocessor 208 that may be used for authentication, data encryption, random number generation, or a combination of these. The validation computer 200 may also include a memory storing an emulation application 210. The emulation application 210 may include a user interface 212, a parser 214, and a result storage and analysis module 216. The emulation application 210 may also include operational modules 218, for example, that manage background processes and error conditions, the breakpoint manager 220, and a communications module 222.

User Interface

The user interface 212 presents those screens and menus associated with validation operations and results analysis. In an embodiment, the emulation application 210 may support three modes of operation, a command line mode, an interactive mode, and an automated mode. The user interface 212 allows, among other things, selection of mode. In the command line mode, all interactions with the EGM 150 are entered manually. Similarly, results are reviewed manually to determine if a test passed. In command line mode, observation of the physical EGM under test may be essential to verify results, such as reel positions and payouts.

In the interactive, or menu-driven, mode, a data file 213 may contain breakpoint setting information and expected results. A series of menus may be presented that lead a test administrator through setup, test, or analysis operations, or a combination of those operations. Breakpoints may be manually set or cleared, or breakpoint data may be taken from the data file. Results are typically automatically compared against the expected results from the data file, but may also be presented for user inspection.

In the automated mode, a minimum amount of data may be entered, such as specifying the data file 213 and, in some cases, one or more paytables. The validation test may then run automatically to the point of being capable of running unattended. Results may be recorded and compared against expected outcomes and a pass/fail score may be reported.

Particularly in the case of a failed test, but for pass cases as well, a full tabulation of results and expected results may be made available for audit or other review.

Figure 4:
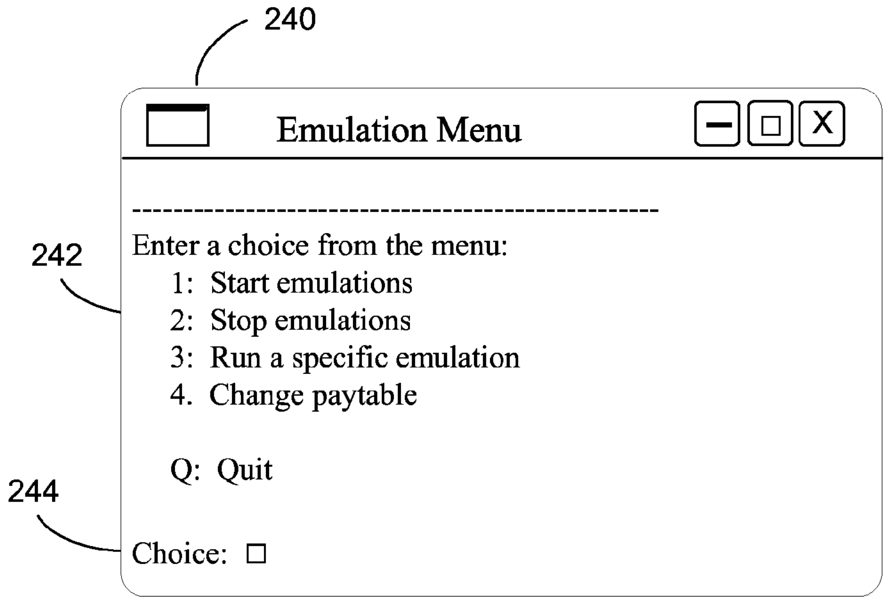
FIGS. 4-6 are simulated screen shots of menus of an embodiment of a user interface used for production software validation.
Figure 5:
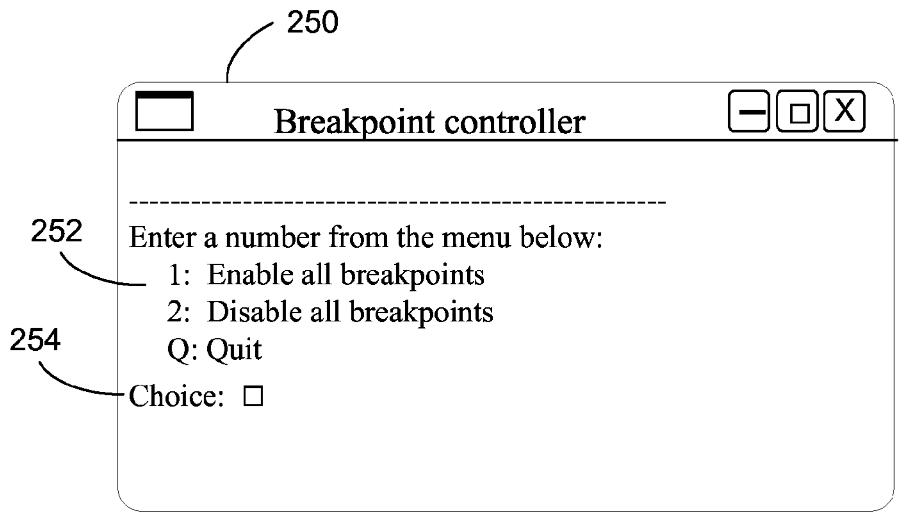
Figure 6:
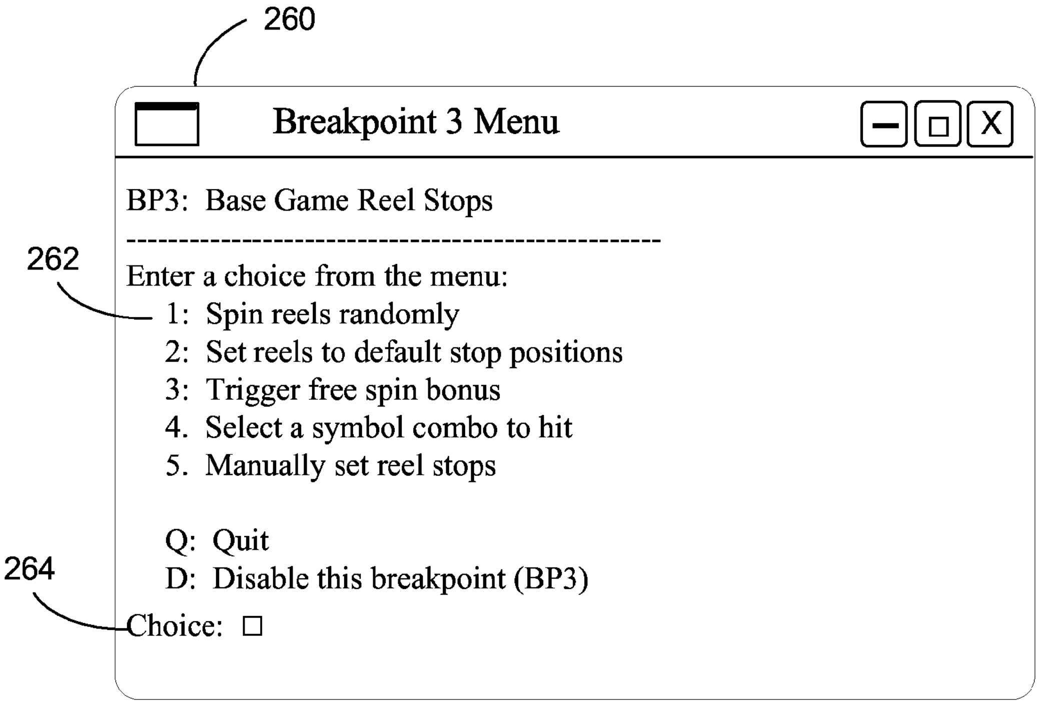
Figure 7:
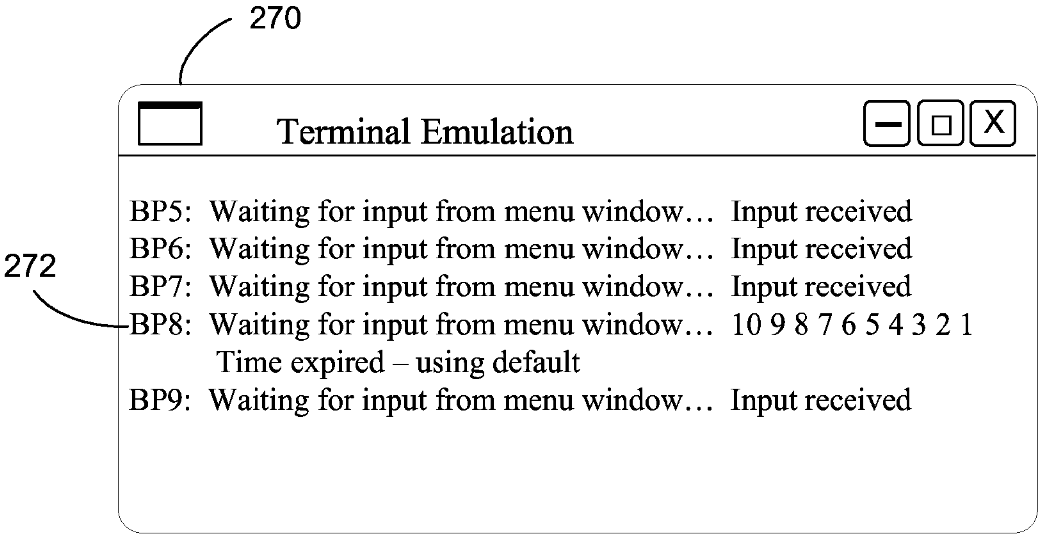
FIG. 7 is a simulated screen shot of a transcript of a manual data entry process of a user interface.
Figure 8:
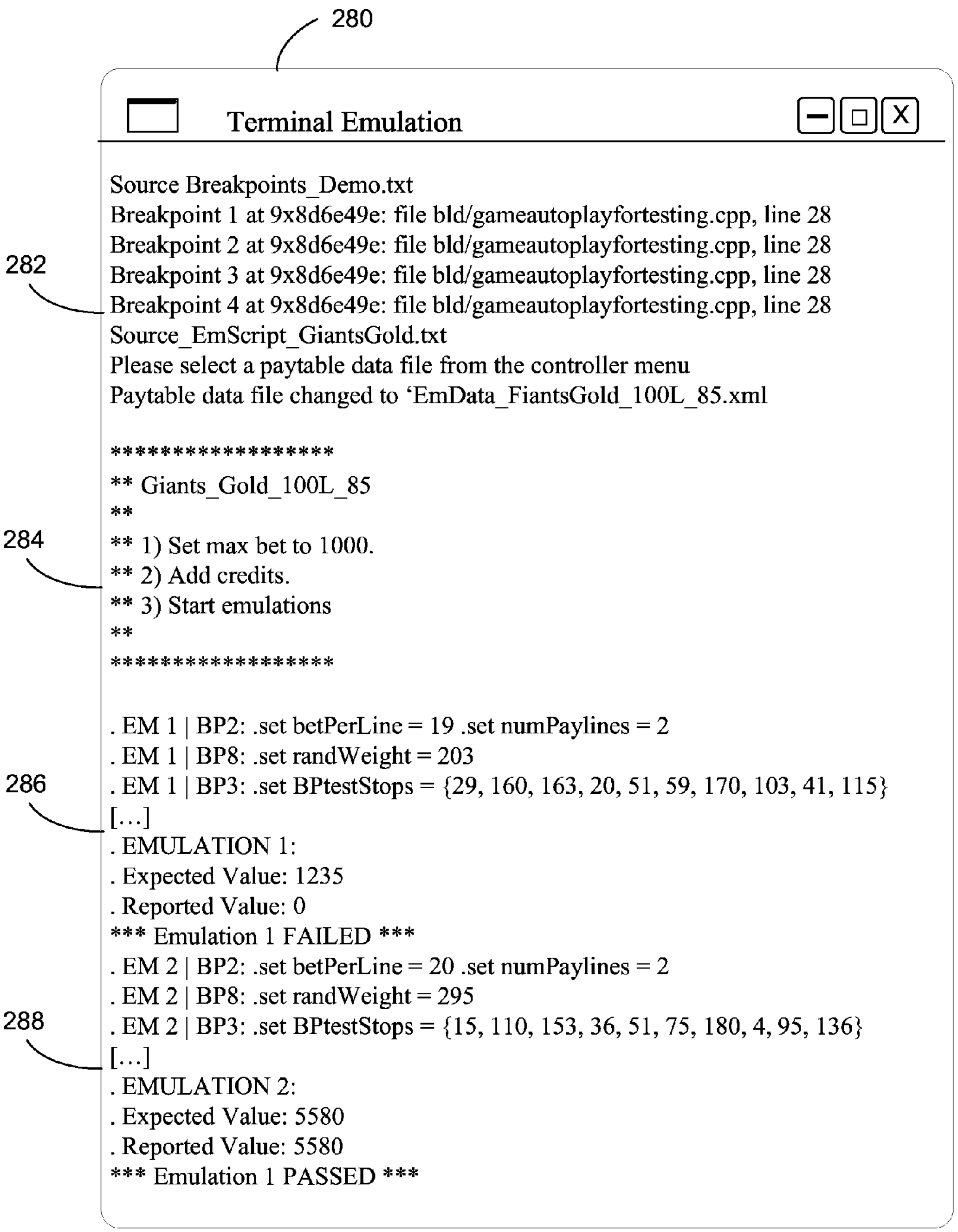
FIG. 8 is a simulated screen shot of a transcript of a multi-pass software validation run.

FIGS. 4-8 illustrate simulated screen shots of representative menus and displays that may be used in the interactive mode or the automated mode of operation. The user interactions depicted are text oriented but cursor-based or touch screen interactions may also be used. FIGS. 4-6 are discussed specifically with respect to specific user interactions. FIGS. 7-8 are output-related discussed in more detail below.

FIG. 4 is a simulated screen shot of a window 240 that may be used to launch an emulation by selecting from one of the offered choices 242 and entering the selection at input field 244. As illustrated, the window 240 may be used to initiate an emulation, select a particular emulation, or to change a pay table prior to running or rerunning an emulation already queued.

FIG. 5 is a simulated screen shot of an exemplary breakpoint setup window 250, that may be one of many associated breakpoint windows. The use of breakpoints is a significant element in performing software validation in an EGM 150 because it allows the normal operation of the electronic gaming machine to be interrupted so that specific variables and machine states can be set to a known condition. By operating from that known state the math model, reel positions, bonus game activations, etc. can be monitored and the resulting outcome compared to an expected behavior. In FIG. 5, the window 250 allows breakpoints to be enabled or disabled by selecting one of the offered choices 252 at the input area 254. In this case, the window 250 allows selection of enabling or disabling all breakpoints.

FIG. 6 is a simulated screen shot of a window 260 that may be used to select an action for a particular breakpoint. As illustrated, reel stop activity choices 262 may be entered into an input selection area 264 to cause that action to be performed when breakpoint 3 is encountered during operation. Additional information on breakpoint management is discussed further below. The sampling of user interactions illustrated in FIGS. 4-6 are illustrative and do not attempt to every possible screen or data entry point available during an outcome verification run.

Parser and Data Files

Returning to FIG. 3, the parser 214 receives a data file 213 and interprets or otherwise extracts information from the file in order to support menu-driven or automated operation of the validation testing procedure. In an embodiment, the data file 213 may be created using XML. The exemplary descriptions that follow use XML for illustration, but other markup or descriptive languages may also be used.

The parser 214 supports the use of the data file 213, e.g., an XML file, in both menu-driven testing and automated testing. The data file 213 may be used to create menu items and associated prompts. To create a menu item, an embodiment may use a construct similar to the following sample:

```
<MenuItem type= menu">
  <short Name> SubMenu_X </shortName>
  <displayName> Open the sub-menu. </displayName>
  <SubMenu_X>
  ...
  </SubMenu_X>
</MenuItem>
```

Main and submenus may use a delimiter, such as <shortName> in this example, that may be used by the parser 214 for identification. If selected by the user, the menu items will generate a submenu. In this example, <displayName> may be used to set a label that is shown to the user instead of the shortName value. Sample menu item types and their associated actions are illustrated below:

```
<MenuItem type= "no action">
  <displayName> Spin reels randomly. </displayName>
  <shortName> SpinRandom </ShortName>
</MenuItem>
```

"No action" menu items are presented to the user but need no additional evaluation from the emulation application 210 before proceeding.

```
<MenuItem type= "db_command">
  <displayName> Set reels to default stop positions. </displayName>
  <shortName> DefaultReelStops </ShortName>
  <dbcommand> set BPtestStops={0,0,0,0,0,0,0,0,0,0} </dbcommand>
</MenuItem>
```

The "db_command" items may be used to run pre-defined commands in the emulation application 210, sometimes also referred to as a debugger. In the strictest sense, the emulation application 210 as used for outcome validation is not a debugger because it is not used to debug a program. However, in the respect that breakpoints are set and internal status is set and/or read, the emulation application 210 is at least functionally similar to a debugger.

```
<MenuItem type= "user_input">
  <displayName> Manually set reel stops. "BPtestStops[10]
  </displayName>
  <shortName> ManualStopsEntry </shortName>
  <userPrompt> #> </userPrompt>
</MenuItem>
```

"User input" items are used to get input from a user. User input may allow, among other actions, manual manipulation of variables and running user-supplied db_commands.

```
<Submenu_X>
  <shortName> SubMenu_X </ShortName>
  <displayName> Welcome to the sub-menu. </displayName>
  <MenuItem type= "no_action">
    <displayName> sub-menu item 1. </displayName>
    <shortName> SubItem1 </ShortName>
  </MenuItem>
  <MenuItem type= "db_command">
    <displayName> sub-menu item2 </displayName>
    <shortName> SubItem2 </ShortName>
    <dbcommand> set randWeight = 27 </dbcommand>
  </MenuItem>
  <MenuItem type= "user_input">
    <displayName> Input you data </displayName>
    <shortName> subItem3 </ShortName>
    <userPrompt> type here </userPrompt>
  </MenuItem>
</Submenu_X>
```

This illustrates nested items using sub-menus. In an embodiment, the shortName value matches the menu's tag.

A particular problem in prior art systems with command line mode, and one that may occur in menu-driven mode is a timeout on user input. The theme/framework 168 in the diagnostic mode places time limits on how long to wait for a response from an operator in a command line or menu-mode test. If an operator does not respond within the timeout period the gaming machine may require rebooting. Because of the complexity of the EGM 150 including security procedures, such a reboot may require 15 minutes or more. Further, the in-process validation test may be lost and any testing to the point of the reboot may have to be re-executed.

FIG. 7 is a simulated screen shot of a window 270 associated with the input of values and the use of the default value. As illustrated in the transcript 272, inputs were received at breakpoints 5-7 but none was received at breakpoint 8. In the current system, the emulation application 210 may monitor the request for input and prior to the end of the timeout period may supply a pre-defined value for the breakpoint and so prevent a time-consuming reboot.

Turning to the fully automated mode, data files used in automated execution mode may have no user interface elements at all, or may have a limited user interface that allows setting certain run-time parameters. Because much of the testing is associated with breakpoint processing, the parser 214 may evaluate the data file submitted for testing and may hand off the in-test execution to the operations module 218 and/or the breakpoint management module 220. A sample automated test set up may include identifying a data file, such as data file 213, containing the test procedure. Such a file may be in the following form:

```
<GameSetup>
   <PaytableID> GiantsGold__100L__85 <PaytableID>
   <OutputFileName> EmResults__GiantsGold__100L__85.txt
   <OutputFileName>
   <FirstEmulationNumber> 1 </FirstEmulationNumber>
   <LastEmulationNumber> 150 </LastEmulationNumber>
</GameSetup>
```

The data file may begin with a <Setup> element that gives information about the paytable the file is to be run with, the log file name, and the start and end emulations. The <PaytableID> and <LastEmulationNumber> may be required, while the others items may be optional. This element may also contain other information in regards to the game setup, such as <MaxBet>, the maximum bet allowed.

The output file named in the set up parameters may store data by emulation run. Result reporting via the output file is discussed more below.

Breakpoint programming is of particular interest during fully automated validation testing. The emulation application 210 may read information from the data file 213 on value setting at breakpoints, by emulation run. Sample code illustrates this aspect:

```
<Emulation 1>
   <BP2__numPaylines> 2 </BP2__numPaylines>
   <BP2__betPerLine> 19 </BP2__betPerLine>
   <BP8__randWeight> 203 </BP8__randWeight >
   <BP6__randWeight> 114 </BP6__randWeight >
   <BP7__weightIndex> 0 </BP7__weightIndex >
   <BP3__BPtestStops> {29, 160, 163, 20, 51, 59, 170,
   103, 41, 115} </BP3__BPtestStops>
   ...
</Emulation 1>
```

Within each <Emulation_X> element, there can be one or more elements for the breakpoints. Each of these breakpoint elements may be tagged with <BPY_varName> where Y is the breakpoint number, varName is the variable name that is to be set at that breakpoint, and the value in the element is the value to be set in the specified emulation run. Note that some breakpoints may allow multiple variables to be set, as illustrated above at breakpoint 2 (BP_2_xx).

One consideration in fully automated testing is repeatedly passing through a particular code section during various tests. In such a case, the emulation application 210 may allow programming to accommodate different values to be input at the same breakpoint through repeated passes, as illustrated in the follow code sample:

```
<BP8__randWeight>
   <Hit__1> 3 </ Hit__1>
   < Hit__2> 19 </ Hit__2>
   < Hit__3> 297 </ Hit__3>
   < Hit__4> 117 </ Hit__4>
   < Hit__5> 6 </ Hit__5>
</BP8__randWeight>
```

In this embodiment, the emulation application 210 will keep track of how many times the breakpoint has been hit and set the appropriate value. Subsequent passes may use the final value or another specified default value.

Particularly in the automated mode, but also in the menu-driven mode, the data file 213 may include instructions and/or references to external programs or other data files (not depicted). The parser 214 may identify those external references and depending on the nature of the external reference, either launch separately, include instructions from, or chain execution to the external reference. In an embodiment, the external reference could be to an additional test process that automatically simulates user input.

Results Storage and Analysis

Returning again to FIG. 3, the results storage and analysis tool 216 permits fully automated testing and results processing including in-game analysis of results. In an embodiment, at least a portion of the results analysis may be executed by the breakpoint management function 220 in conjunction with the parser 214. The following illustrates a sample code snippet defining how to check and process values at a particular breakpoint:

```
<BP4__gameWinAmount cmd="compare" type="integer" log="true">
   <ExpectedValue> 77095 </ExpectedValue>
   <StringForReportedValue> 19 </StringForReportedValue>
   < StringIfTrue > printf "*Emulation %d PASSED*\n",
   $emluationNumber
</StringIfTrue>
   < StringIfFalse > printf "*Emulation %d FAILED*\n",
   $emluationNumber
</StringIfFalse>
</BP4__gameWinAmount>
```

Data may be compared at breakpoints and specific actions taken depending on the outcome of the comparison. The illustrated type of breakpoint processing above reads a value from the game, compares it to the value given in the <ExpectedValue>, then will take action based on the <StringIfTrue> or <StringIfFalse> elements. If the 'log' attribute for this breakpoint it set to true, then the output will be written to the log files specified in the <Setup> element illustrated in the <GameSetup> code above.

The description of the embodiment above uses several constructs regarding the architecture of the emulation application 210, specifically the breakdown into various modules. Other embodiments may use differing architectures but support the same functional elements. For example, functions described separately above for data file parsing, operations, and breakpoint management may be combined into one module or those functions combined in a different fashion without departing from the intent of this disclosure.

FIG. 8 is a simulated screen shot of a window 280 illustrating a portion of a log file such as may have resulted from an emulation setup similar to that discussed above. The window 280 may include input selection information 282, run information 284, emulation run 1 results, 286 and emulation run 2 results 288. As shown in this example, emulation 1 failed and emulation 2 passed. Depending on the particular implementation, a single result may be reported to an operator or logged as either pass or fail. It may then be up to the operator whether to pull a more detailed log file to determine the nature and location of the failed outcome.

Figure 9:
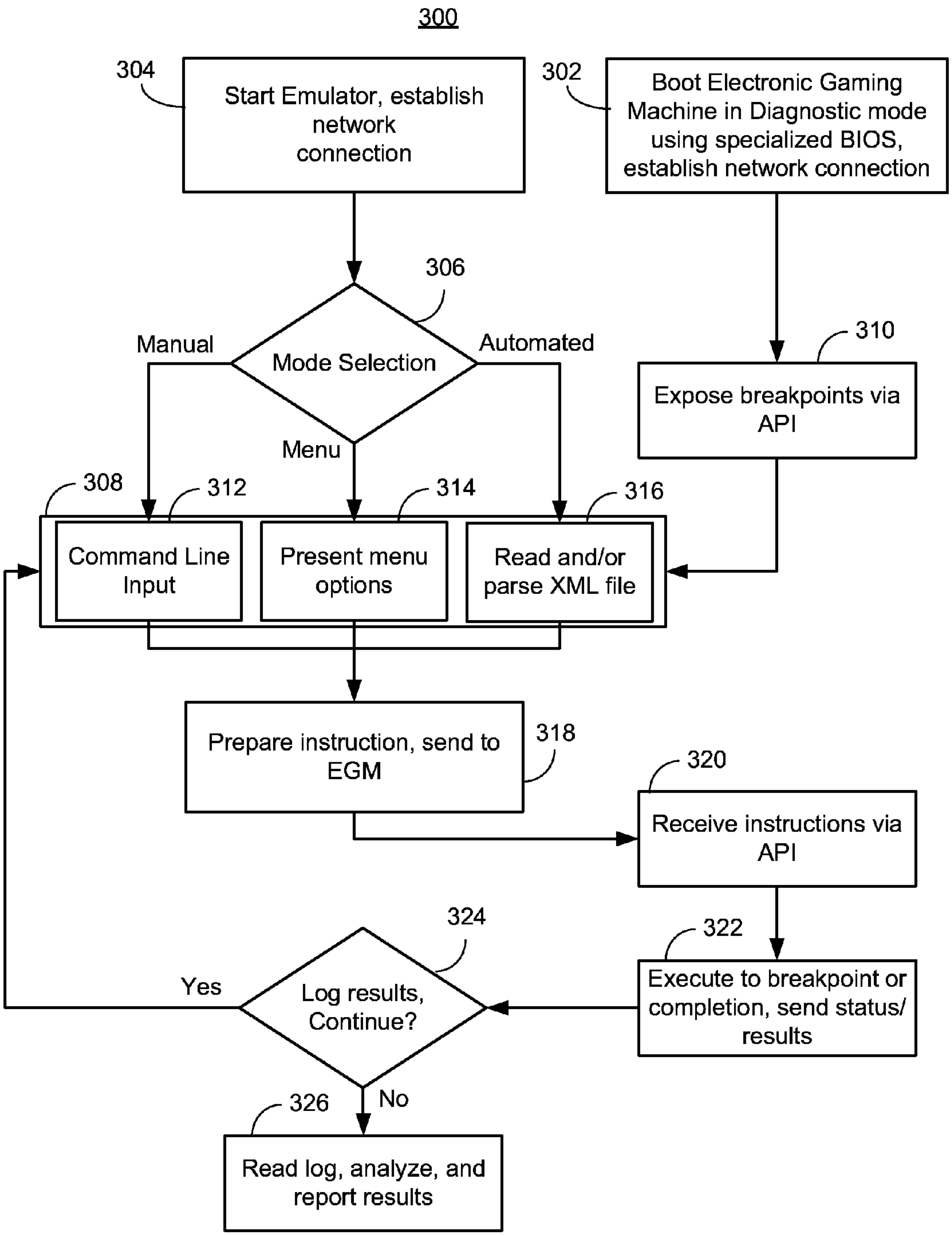
FIG. 9 is flowchart of a method of performing production software validation testing in an electronic gaming machine.

FIG. 9 is a flowchart of a method 300 of performing production software validation testing in an electronic gaming machine 150 using a emulation application 210 at a validation computer 200. At a block 302, a specialized diagnostic BIOS may be installed and the electronic gaming machine 150 may be booted into a diagnostic mode. The diagnostic BIOS opens network connections, for example, to the validation computer 200 and prepares debugger server 116 to receive a connection.

At block 304, the emulation application 210 may start at the validation computer 200, launch a user interface 212, and establish a connection with the electronic gaming machine 150. In an embodiment, the emulation application 210 may connect with the electronic gaming machine 200 via a client-server protocol.

At a block 306, a selection of operating mode may received be via the user interface 212. In an alternate embodiment, a data file 213 for automated execution may be passed by reference at launch time and execution may proceed without presentation of a user interface.

According to the selection at block 306, execution may continue in one of several paths. If command line mode is selected, execution continues at block 312 and a manually operated test may be executed. If a menu mode is selected, execution continues at block 314 and the semi-automated test process described above is executed. If an automated mode is selected, at block 316, a suitable data file may be identified, loaded, and used to perform an automated test. In an embodiment, even in automated mode, a user interface may be presented to allow interruption of a test-in-progress or to monitor test results.

In total, the various testing modes 312, 314, 316 are represented by block 308. At block 310, the electronic gaming machine 150, when booted using the diagnostic BIOS, may expose breakpoints via an application program interface (API) element of the framework 168. The breakpoints allow the emulation application 210 to halt execution of the production software in the electronic gaming machine 150 so that the emulation application 210 can read and set values. This process is valid for any of the interface modes.

At block 318, the emulation application 210 may prepare an instruction and send it to the electronic gaming machine 150. The instruction may include setting values, reading values, and setting or clearing breakpoints, including, but not limited to those discussed above.

At block 320, the instruction may be received at the electronic gaming machine 150 via the API. At block 322, the electronic gaming machine 150 may perform according to the received instructions. For example, data may be reported, values set and/or execution of the production software under test may be restarted and run to the next breakpoint, if any.

At block 324, the emulation tool 210 may log any results received from the electronic gaming machine 150. If the validation test is complete, execution may continue at block 326.

At block 326, the emulation tool may read the log, analyze the results and report them in a designated fashion. In an embodiment, as described above, a data file 213 may include expected results, allowing the emulation tool 210 to evaluate the results and make a pass/fail decision for the validation test. In some cases, additional testing may be necessary to complete the full validation to meet any regulatory requirements.

If, at block 324, additional testing is indicated, execution may continue at block 308 where, depending on the selected testing mode, either manually entered or automatically entered values may be used for the next test cycle.

In other embodiments, the framework 168 and emulation tool 210 may be used to capture and validate power recovery, that is, correct response to a power cycle, program and video memory usage, tilt conditions, reel and other screen frame rates, internal data traffic, etc. Other conditions that may be tested and verified using the system and techniques described above include language localization, localized currency calculations, localized currency symbols, video memory (VRAM) usage, dynamic memory (DRAM) usage, network latency, system response times, system resource allocations, accounting results, and internal meter states, to name a few. In general, the emulation tool 210 may be used to evaluate any system state or condition.

Figure 10:
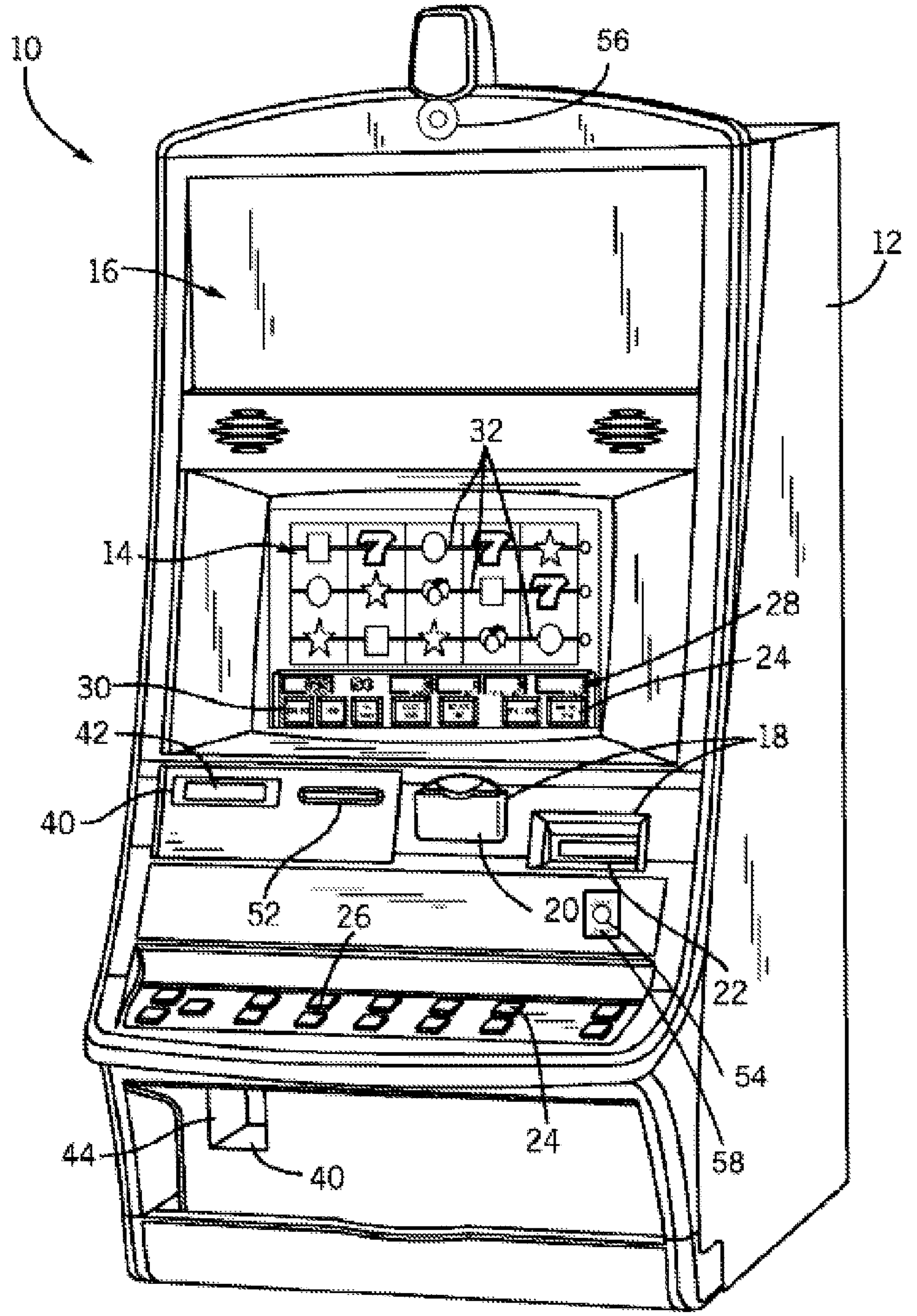
FIG. 10 is a perspective view of a gaming system according to an embodiment of the present disclosure.

FIG. 10 is a perspective view of a gaming machine 10 according to an embodiment of the present disclosure. The gaming machine 10 may be used in gaming establishments such as casinos. The gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 may include a housing 12 and may include input devices, including a value input device 18 and a player input device 24. For output, the gaming machine 10 may include a primary display 14 for displaying information about the basic wagering game. The primary display 14 may also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 may receive currency and/or credits that may be inserted by a player. The value input device 18 may include a coin acceptor 20 for receiving coin currency. Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 may include a plurality of push buttons 26 on a button panel for operating the gaming machine 10. In addition, or alternatively, the player input device 24 may include a touch screen 28 mounted by adhesive, tape, or the like over the primary display 14 and/or secondary display 16. The touch screen 28 may include soft touch keys 30 denoted by graphics on the underlying primary display 14 and may be used to operate the gaming machine 10. The touch screen 28 may provide players with an alternative method of input. A player may enable a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game. In some embodiments, a physical player sensor 56 may also be included. The physical player sensor 56 may be a camera or a biometric sensor or a motion detecting device. The physical player sensor 56 may be used to provide inputs to the game, such as images, selection motions, biometric data and other physical information.

The various components of the gaming machine 10 may be connected directly to, or contained within, the housing 12, as seen in FIG. 10, or may be located outboard of the housing 12 and connected to the housing 12 via a variety of different wired or wireless connection methods. Thus, the gaming machine 10 may include these components whether housed in the housing 12, or outboard of the housing 12 and connected remotely. As discussed above, these wired or wireless connections may be used to communicate accessory information or may be used on a temporary basis to transfer update information.

The operation of the basic wagering game may be displayed to the player on the primary display 14. The primary display 14 may also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 may include the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 may be slanted at about a thirty-degree angle toward the player of the gaming machine 10.

A player may begin play of the basic wagering game by making a wager via the value input device 18 of the gaming machine 10. A player may select play by using the player input device 24, via the buttons 26 or the touch screen keys 30. The basic game may include of a plurality of symbols arranged in an array, and may include at least one payline 32 that indicates one or more outcomes of the basic game. Such outcomes may be randomly selected in response to the wagering input by the player. At least one of the plurality of randomly-selected outcomes may be a start-bonus outcome, which may include any variations of symbols or symbol combinations triggering a bonus game.

In some embodiments, the gaming machine 10 may also include a player information reader 52 that allows for identification of a player by reading a card 54 with player information 58 indicating his or her true identity. The player information reader 52 is shown in FIG. 10 as a card reader, but may take on many forms including a ticket reader, bar code scanner, RFID transceiver or computer readable storage medium interface. Currently, player information 58 may be generally used by casinos for rewarding certain players with complimentary services or special offers. For example, a player may be enrolled in the gaming establishment's loyalty club and may be awarded certain complimentary services as that player collects points in his or her player-tracking account. The player may insert his or her card 54 into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to recall or restore game assets that the player achieved and saved during a previous game session either in the gaming establishment or on a separate computing device at a different location. Other embodiments of the gaming machine 10 are possible, such as handheld or mobile gaming machine (not depicted). While an embodiment of gaming machine configuration is described with respect to casino floor games, the equipment and method are equally applicable to handheld or mobile gaming machines for which an ad hoc and secure mechanism for updating software and configuration are desired.

In summary, an emulation tool and associated data files with test and expected results information may be used to reliably and repeatedly perform tests of production software in electronic gaming machines. Because the data file may be in a human readable form, such as XML, the data file may be easily validated so that both internal testers and third party validation entities may perform validation testing with confidence. The use of the data file in an automated fashion allows testing to proceed without human intervention so that tests may be performed in batches and without human interaction. This capability speeds turnaround on validation testing and ultimately allows manufacturers and gaming system operators to field new systems quicker and remain more competitive while still satisfying requirements for independent validation.

Each of these embodiments and obvious variations thereof is contemplated as falling within the spirit and scope of the present disclosure as defined and set forth in the following claims. Moreover, the present concepts expressly include any and all combinations and subcombinations of the preceding elements and aspects.

What is claimed is:

1. A testing tool includes one or more processors for validation of production software in an electronic gaming machine comprises:

a validation service executed by a first processor installed in the electronic gaming machine, the validation service having access to system resources of the electronic gaming machine via a diagnostic basic input/output system (BIOS), the validation service exposing one or more breakpoints in the production software via an application program interface (API); and an emulation tool executed by a second processor installed in a host system, the emulation tool in communication with the validation service of the electronic gaming machine, the emulation tool including:

a user interface module that presents: i) a selection of operating options, ii) an electronic gaming machine state, and iii) validation results;

a structured data file parser that sets test parameters based on information stored in a file containing structured data;

a communications module that sends the test parameters to the electronic gaming machine via the API to activate the one or more breakpoints and to set at least one value in the test parameters, the at least value including at least one of a random number, a bonus game activation, a symbol value, or a wager line, wherein operation of the electronic gaming machine continues after the one or more breakpoints to determine an outcome based on the at least one value; and a results module that generates validation results by comparing the outcome and an expected outcome.

2. The testing tool of claim 1, wherein the emulation tool further comprises:

a breakpoint module for examining and setting operational values of the electronic gaming machine during execution of the production software.

3. The testing tool of claim 2, wherein the user interface module is configured to present the selection of operating options via a menu of selections including:

i) an automated structured data file-driven mode; ii) a menu driven mode with pre-set validation selections; and iii) a manually operated command line mode.

4. The testing tool of claim 3, wherein the user interface module is further configured to present the menu of selections including a help mode.

5. The testing tool of claim 3, wherein the menu driven mode with the pre-set validation selections includes using an structured data file-based list of inputs and expected outcomes.

6. The testing tool of claim 3, wherein the menu driven mode operating option comprises a companion tool that interactively manages breakpoints and presents queries related to bonus settings, bonus game activation, and test sequences.

7. The testing tool of claim 1, wherein the structured data file parser configured to set test parameters comprises a routine to read an instruction and launch an additional test process corresponding to the instruction.

8. The testing tool of claim 1, wherein the results module is further configured to check internal contents of a non-volatile memory of the electronic gaming machine.

9. The testing tool of claim 8, wherein the results module is further configured to verify one or more of a language localization, localized currency calculations, a localized currency symbol, VRAM/DRAM usage, a frame rate, network latency, a response time, a resource allocation, an accounting result, and a meter state.

10. The testing tool of claim 1, further comprising a mathematical design module configured to use a mathematical model of the electronic gaming machine and produce a structured data-formatted outcome file for use by the results module.

11. A method of performing validation testing of an electronic gaming machine, the method comprising:

providing a host computer with a memory that stores an emulation tool for execution by a processor installed in the host computer;

booting the electronic gaming machine into a validation mode using a specialized binary input/output system (BIOS);

after booting in the validation mode, activating a network connection at the electronic gaming machine to the emulation tool;

after booting in the validation mode, exposing breakpoints in the electronic gaming machine to the emulation tool;

reading, at the emulation tool, a data file having instructions used by the emulation tool to automatically operate the electronic gaming machine via the network connection; and during operation of the electronic gaming machine per the instructions in the data file:

activating one or more breakpoints exposed by the emulation tool;

at a breakpoint, setting via the network connection at the electronic gaming machine at least one value read from the data file, the at least one value including at least one of a random number value, a bonus game activation, a symbol value, or a wager line;

continuing operation of the electronic gaming machine after the breakpoint;

determining an outcome based on the at least one value;

comparing one or more outcome values against an expected outcome value read from the data file; and determining that the validation testing of the electronic gaming machine was successful based on the comparison.

12. The method of claim 11, further comprising:

receiving a selection of a testing mode at the emulation tool; and receiving a selection of the data file for reading at the emulation tool.

13. The method of claim 11, wherein comparing one or more outcome values includes comparing data in a memory location of the electronic gaming machine to the expected outcome value read from the data file.

14. The method of claim 11, further comprising:

setting a countdown timer to allow manual intervention during the validation testing; and providing a default value at an expiration of the countdown timer when no manual intervention is received.

15. A non-transitory computer-readable memory installed in a computer having computer-executable instructions configured to generate a user interface when executed on a processor for a validation tester configured for validation of production software of an electronic gaming machine comprising:

a user interface module configured to present: i) a selection of operating options, ii) an electronic gaming machine state, and iii) validation results;

a communication module that communicates with the electronic gaming machine via an application program interface executed on the electronic gaming machine that exposes breakpoints in the production software of the electronic gaming machine;

an structured data file parser configured to set test parameters in the electronic gaming machine based on information stored in a file containing structured data;

a breakpoint module that uses the test parameters to examine and set electronic gaming machine operational values, wherein the test parameters cause the electronic gaming machine to:

activate one or more breakpoints using a breakpoint module;

set, at a breakpoint, at least one value in the test parameters corresponding to a random number value, a bonus game activation, a symbol value, or a wager line; and continue operation of the electronic gaming machine production software to reach an actual result based on the at least one value;

a results module configured to generate validation results by comparing the actual result and an expected result.

16. The computer-readable memory of claim 15, wherein the electronic gaming machine supports communication with the validation tester via the communication module only when the electronic gaming machine is booted using a diagnostic BIOS.

17. The computer-readable memory of claim 15, wherein the file containing the structured data further includes XML-formatted data that describe expected results for a particular validation test.

18. The computer-readable memory of claim 15, wherein the user interface module receives a selection from a menu-driven list of testing options that determines operation of the validation tester in a fully automated mode driven by a test data file, a semi-automated mode supporting manual operation in conjunction with predetermined test information, or a manual mode.

* * * * *